United States Patent [19]

Gronholm

[11] 4,249,097
[45] Feb. 3, 1981

[54] DYNAMOELECTRIC MACHINE HAVING UNIFORMLY CIRCUMFERENTIALLY DISPLACEABLE STATOR CORE

[75] Inventor: Richard A. Gronholm, Monroeville, Pa.

[73] Assignee: Westinghouse Electric Corp., Pittsburgh, Pa.

[21] Appl. No.: 46,600

[22] Filed: Jun. 7, 1979

[51] Int. Cl.³ .......................... H02K 5/24; H02K 1/12
[52] U.S. Cl. ........................................ 310/51; 310/91; 310/259; 310/258
[58] Field of Search ................... 310/51, 157, 91, 254, 310/258

[56] References Cited

U.S. PATENT DOCUMENTS

| | | | |
|---|---|---|---|
| 2,199,351 | 4/1940 | Taylor | 310/258 |
| 2,424,299 | 4/1947 | Baudry et al. | 310/51 UX |
| 2,554,226 | 5/1951 | Taylor | 310/51 UX |
| 2,720,600 | 10/1955 | Pollard | 310/51 |
| 2,846,603 | 8/1958 | Webster et al. | 310/51 X |
| 2,953,697 | 9/1960 | Wall | 310/258 X |
| 2,973,442 | 2/1961 | Wilson | 310/258 |

Primary Examiner—Mark O. Budd
Attorney, Agent, or Firm—G. H. Telfer

[57] ABSTRACT

The stator core of a dynamoelectric machine is end-supported by a flexible mounting which includes bore rings encircling the stator core near each axial end and at spaced-apart locations intermediate thereto. Outer and inner place springs axially extend independently along each exterior side of the stator core within the horizontal center plane thereof and below the stator core within the vertical center plane thereof to independently interconnect the bore rings with end boxes situated at either axial end of the stator core. The outer springs are each joined to at least one intermediately disposed bore ring and the inner springs are each joined to at least one end-disposed bore ring. The bore rings have notches, indentations, and/or flat surfaces on their outer periphery for attachment to each of the springs.

7 Claims, 4 Drawing Figures

4,249,097

DYNAMOELECTRIC MACHINE HAVING UNIFORMLY CIRCUMFERENTIALLY DISPLACEABLE STATOR CORE

BACKGROUND OF THE INVENTION

1. Field of the Invention

This invention relates to a flexible mounting for an end-supported stator core in a dynamoelectric machine, and more particularly to a structure employing end boxes for the entire mounting and support of a stator core in a horizontal direction and for attenuating radial vibrations of the stator core.

2. Description of the Prior Art

The practice of attenuating radial vibrations of a stator core is known in the art and is typically accomplished by employing either vertically-flexible springs or horizontally-flexible springs between the stator core and an adjacent dynamoelectric machine frame along the entire length of the stator core. According to other known practices, an end-supported mounting for a stator core is achieved through the use of one or two bore rings for a stator core of a dynamoelectric machine of a relatively low rating. When more than one pair of bore rings is required as, for example, in a relatively long dynamoelectric machine, the intermediate bore rings are connected to an outer frame which extends along the complete length of the stator core. In these known constructions, the practices of attenuating radial vibrations of a stator core demand the use of a radially-outward adjacent structure to support the core radially along the complete axial length of the core. Such support is necessary to allow all sections of the stator core to circumferentially rotate the same distance during a short-circuit condition. These support arrangements eliminate slippage between punchings and subsequent stator core and coil insulation damage for machines of relatively large rating. However, these known arrangements are not economical for dynamoelectric machines of moderate power ratings such as air-cooled medium turbine generators.

A commonly assigned copending patent application by J. M. Mayher and A. S. Ying Ser. No. 965,007 filed Nov. 30, 1978, illustrates multiple springs disposed on both sides of a supported stator core with those springs being joined to selected bore rings encircling that stator core. The illustrated stabilizer constituted a single spring (25) which was joined to the bore rings below the stator core and prevented substantial horizontal movement of the stator core. While such structure uniformalized the circumferential displacement of the stator core at the bore rings' axial locations over previous support structures, it was subsequently determined from extensive analysis that under some operating conditions nonuniform circumferential displacement of the stator core could be obtained with such structure.

SUMMARY OF THE INVENTION

In accordance with the present invention an improved dynamoelectric machine having an end-supported stator core is provided for ensuring uniform stator core circumferential displacement along its axial length and for supporting steady state and short circuit torques while minimizing transmission of stator core vibrations to the stator core's end supports.

The invention generally comprises a stator core, bore rings situated about the stator core at selected axial locations, end box structures located on opposite axial ends of the stator each including a support ring for supporting the stator core, a plurality of springs situated at each side of the stator core connecting the support rings to the bore rings wherein an inner spring is joined to an end-disposed bore ring and an outer spring is joined to a bore ring intermediately disposed between the end-disposed bore rings, and a stabilizer structure constituting another plurality of springs extending below the stator core to connect the bore rings to the support rings wherein an inner spring is joined to an end-disposed bore ring and an outer spring is joined to an intermediately disposed bore ring.

In a preferred embodiment of the invention the springs constitute flat plates and are joined to flat peripheral surfaces formed on the bore rings. The outer springs have greater effective lengths than the inner springs with the spring constants cooperating to provide equal circumferential bore ring displacements. While the springs are preferably axially continuous, it is sometimes desirable to utilize two members for each spring such that the members are cantilevered from opposite support rings to the appropriate bore rings. For greater rigidity the radially inner springs may also be joined to intermediately disposed bore rings.

BRIEF DESCRIPTION OF THE DRAWINGS

The features and advantages of the present invention will be more fully understood when the following description is read in light of the accompanying drawings, in which.

DESCRIPTION OF THE PREFERRED EMBODIMENT

Figure 1:
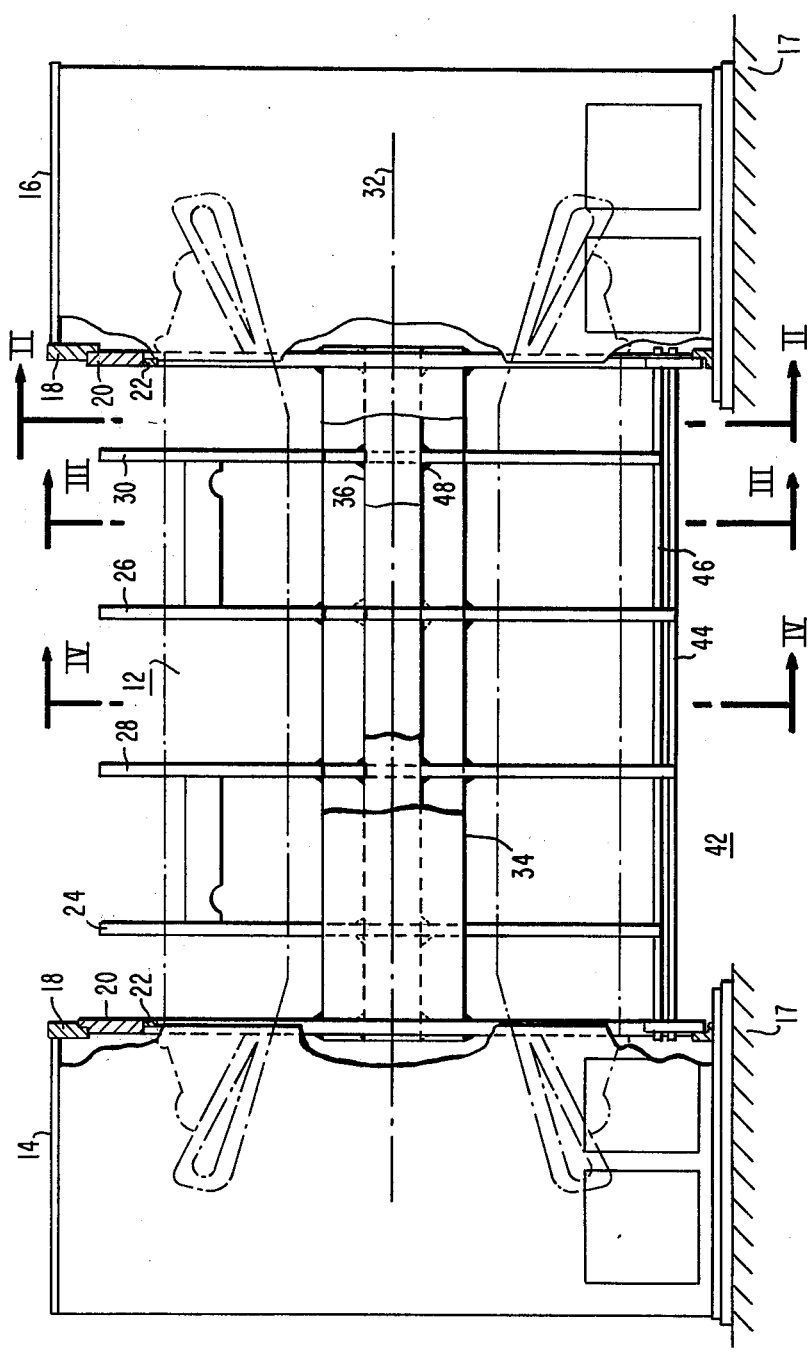
FIG. 1 is a side elevational view showing the arrangement of parts for providing an end-supported, flexibly-mounted stator core according to the present invention.
Figure 2:
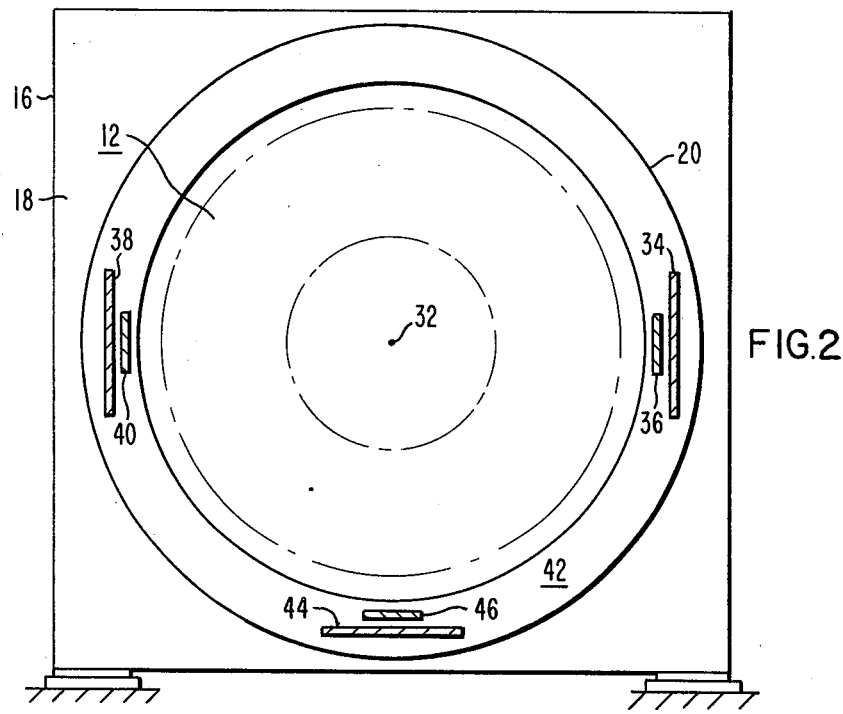
FIG. 2 is a sectional view taken along line II—II of FIG. 1.

In FIG. 1, there is illustrated a dynamoelectric machine 10 embodying the features of the present invention. The familiar stator core is shown by phantom lines and indicated by reference numeral 12. The mounting for the stator core of the present invention is particularly useful for air-cooled medium turbine generators with an end-supported structure. An end box 14 is arranged at a first or exciter end of the stator core and an end box 16 is arranged at the second or turbine end of the stator core. The end boxes are rigidly held to the illustrated foundation 17 by foundation bolts. As shown in FIGS. 1 and 2, the end boxes each include a mounting plate 18 which is joined by fastening means such as threaded bolts and/or welds, as desired, to end support rings 20. Baffle ring segments 22 are interposed between the stator core 12 and each end support ring 20. A plurality of bore rings encircle the stator core 12 at coaxially, spaced-apart locations and project radially therefrom. In FIG. 1, there are four bore rings 24–30. Bore rings 30 and 26 are also respectively shown in FIG. 3 and FIG. 4. Building bolts (not shown) are welded to the inside diameter of the bore rings 24–30 so as to extend parallel to longitudinal axis 32 to form a stiff support frame. Punchings are stacked on top of each other with the building bolts protruding therethrough inside the bore rings. The punchings are clamped together by through-bolts (not shown) to form a structure that is entirely supportable by the end boxes through the use of springs. As shown in FIGS. 1-4, extending along one side of the stator core 12 at the horizontal center plane are adjacent outer (occupying a second position) and inner (occupying a first postion) plate spring 34 and 36 respectively and at the other side of the stator core, similarly arranged, are adjacent outer (occupying a second position) and inner (occupying a first position) plate springs 38 and 40 respectively. These plate springs extend independently of one another to structurally interconnect selected bore rings with support rings 20. Stabilizer structure 42 includes a plurality of adjacent plate springs 44 and 46 which extend below and along the vertical center plane of stator core 12. Outer (occupying a fourth position) plate spring 44 extends independently of inner (occupying a third position) plate spring 46 and each structurally interconnect selected bore rings with support rings 20.

Figure 3:
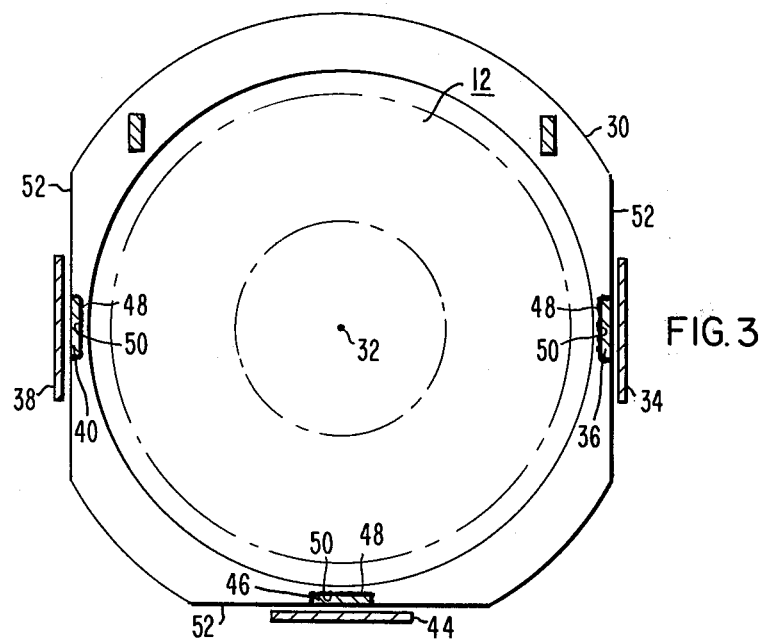
FIG. 3 is a sectional view taken along line III—III of FIG. 1.
Figure 4:
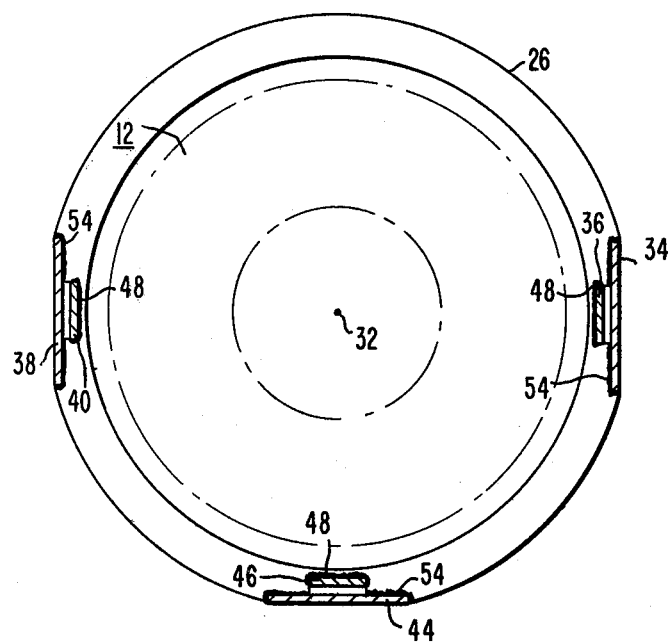
FIG. 4 is a sectional view taken along line IV—IV of FIG. 1.

As illustrated in FIGS. 1 and 3, inner plate springs 36, 40, and 46 are each joined by exemplary welds 48 or other fastening means to the axially end-disposed bore rings 24 and 30 preferably along the periphery of notch 50 formed in flat edge surface 52 on the outside diameter of the subject bore rings. As illustrated in FIGS. 1 and 4, outer plate springs 34, 38, and 44 are joined by exemplary welds 48 to bore rings 26 and 28 which are axially intermediately-disposed between end-disposed bore rings 24 and 30. These intermediate bore rings have suitably dimensioned indentations 54 to receive the outer springs in addition ot notches 50 which receive the inner plate springs. Notches 50, indentations 54, and welds 48 cooperatively provide effective spring restraint in and high strength structural coupling to the bore rings. If desired, the springs 36, 40 and 46 may also be joined (as illustrated) by welds 48 to bore rings 26 and 28. It is within the scope of the present invention to substitute two short plate spring members for each single plate spring 36, 40, or 46. In such short plate substitution one spring member extends between bore ring 24 and end ring 20 of end box 14 and the second spring member extends between bore ring 30 and end ring 20 of end box 16. Moreover, it is also immaterial whether the outer springs 34, 38 and 44 extend continuously between bore rings 26 and 28.

Plate springs 34-40 and 44-46 are radially flexible to effectively isolate double-frequency radial stator core vibrations and are tangentially stiff relative to the stator core 12 to resist short-circuit and operating torques and minimize circumferential displacements of the stator core. It is preferred to use a minimum number of bore rings, but excessive stress upon any single ring must be avoided and all bore rings are designed to equally resist the short-circuit torque. This is achieved according to the present invention by independently supporting all bore rings from the end boxes with springs having either long or short effective lengths. The number of bore rings and their extreme axial positions can be determined by considering the maximum allowable unsupported length of the stator core 12 between consecutive bore rings. Use of unsupported core lengths less than the maximum provides assurance against interlaminar punching slippage within the stator core.

The spring constants of springs 34, 38, and 44 as compared with springs 36, 40 and 46, respectively, are approximately the same. However, the spring constants are selected to provide support with equal bore ring circumferential deflections under short-circuit conditions without overstressing any spring. This feature allows all sections of the stator core to rotate the same amount, eliminates slippage between punchings and allows the total short-circuit torque to be transmitted by the punchings. The springs are stiff in the circumferential direction but flexible in the radial direction. As such, the side springs provide the main support for the stator core's weight while the stabilizer structure 42 suppresses and minimizes horizontal displacement of the stator core. Springs 34, 38, and 44 have longer effective lengths and are wider and/or thicker than springs 36, 40, and 46.

Although springs 36, 40 and 46 are illustrated as being joined to intermediate bore rings 26 and 28, it is to be understood that their jointure is unnecessary for purposes of the present invention. However, the springs 34, 38, and 44 must not be connected to end-disposed bore rings 24 and 30. Alternate means (not shown) for joining bore rings with the springs include connecting plates extending radially outward from the bore rings to the springs. The bore rings 24-30 preferably include notches 50 for facilitating attachment to springs 36, 40, and 46. Flat peripheral edge surfaces 52 are preferably provided on end-disposed bore rings to avoid bore ring interference with the outer springs. Intermediately disposed bore rings preferably include indentations 54 which facilitate attachment of the outer springs thereto. It is to be understood that while four bore rings are shown and described, at least three bore rings are necessary, but more than four may be utilized without departing from the spirit and scope of the present invention.

I claim:
1. A dynamoelectric machine comprising:
   stator core;
   a plurality of bore rings surrounding said stator core at selected axial locations, said locations including both axial ends and position intermediate thereto;
   end box structures disposed on opposite ends of said stator core, each end box structure including support rings for supporting said stator core;
   a first plurality of springs extending independently at each side of said stator core within the horizontal center plane thereof to independently interconnect the bore rings with said end box support rings, said springs occupying first and second positions, said springs providing a radial resilience to the stator core to isolate core vibrations and tangential rigidity to resist short circuit torque, each of the springs occupying a first position being joined to at least one axially end-disposed bore ring, each of the springs occupying a second position being joined to at least one axially intermediately disposed bore ring and extending independently of said axially end-disposed bore rings; and
   a stabilizer structure constituting a second plurality of springs extending independently below the stator core within the vertical center plane thereof to independently interconnect the bore rings with said end box support rings, said springs occupying third and fourth positions, said springs providing a radial resilience to the stator core to isolate core vibrations and tangential rigidity to resist short circuit torque, said spring occupying said third position being joined to at least one axially end-disposed bore ring, said spring occupying said fourth position being joined to at least one axially interme- diately disposed bore ring and extending independently of said axially end-disposed bore rings.

2. The dynamoelectric machine of claim 1, said first plurality of springs comprising: flat plates.

3. The dynamoelectric machine of claim 1, said second plurality of springs comprising: flat plates.

4. The dynamoelectric machine of claim 1, wherein said springs occupying said second and fourth positions have greater respective effective lengths than said springs occupying said first and third positions.

5. The dynamoelectric machine of claim 1, wherein said springs have spring constants which permit substantially equal circumferential deflections of said bore rings.

6. The dynamoelectric machine of claim 1, wherein said bore rings have notches in their peripheral surfaces for receiving said springs.

7. The dynamoelectric machine of claim 1, wherein at least one of said springs occupying said first and third positions is also joined to at least one of said intermediately disposed bore rings.

* * * * *